(12) United States Patent
Subramanian et al.

(10) Patent No.: US 10,397,395 B2
(45) Date of Patent: Aug. 27, 2019

(54) DEPARTURE OR ENTRY INTENT-BASED REMINDERS

(71) Applicant: Microsoft Technology Licensing, LLC, Redmond, WA (US)

(72) Inventors: Sudharssun Subramanian, Bellevue, WA (US); Parmjeet Singh, Seattle, WA (US); Lakshmi Narayana Mummidi, Bellevue, WA (US); Siddhartha Cingh Arora, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/597,884

(22) Filed: May 17, 2017

(65) Prior Publication Data

US 2018/0338031 A1    Nov. 22, 2018

(51) Int. Cl.
*H04M 1/725* (2006.01)
*H04W 4/021* (2018.01)
(Continued)

(52) U.S. Cl.
CPC ........ *H04M 1/72572* (2013.01); *H04L 67/22* (2013.01); *H04W 4/021* (2013.01);
(Continued)

(58) Field of Classification Search
CPC ....... H04W 4/02; H04W 4/029; H04W 4/021; H04W 4/023; H04W 24/10;
(Continued)

(56) References Cited

U.S. PATENT DOCUMENTS 8,054,180 B1 * 11/2011 Scofield .................. H04W 4/02
340/539.11
9,349,104 B2    5/2016 O'Neill et al.
(Continued)

OTHER PUBLICATIONS

Kim, et al., "Gate Reminder: A Design Case of a Smart Reminder", In Proceedings of the 5th conference on Designing Interactive systems: processes, practices, methods, and techniques, Aug. 1, 2004, 10 pages.
"International Search Report and Written Opinion Issued in PCT Application No. PCT/US18/028740", dated Jul. 4, 2018, 13 Pages.

Primary Examiner — Quoc Thai N Vu
(74) Attorney, Agent, or Firm — Merchant & Gould

(57) ABSTRACT

Intent-based reminders are provided. A user is enabled to initiate a reminder request based on an intent to enter or leave a given location. In a geofence training process, a plurality of geofences are created for plotting a path and subsequently tracking the user's traversal of the path for inferring the user's intent to depart or enter the location. A signal strength of a WLAN is recorded at each geofence. As the user traverses the path, a determination is made as to whether a predetermined percentage of the geofences is triggered in a sequential order by comparing the signal strength of the WLAN against the recorded WLAN signal strengths at the geofences. In some examples, signal strengths of neighboring WLANs are recorded and used to filter out false triggers. When a determination is made that the user's intent is to depart or enter the location, a reminder is provided.

20 Claims, 15 Drawing Sheets

(51) Int. Cl.
*H04W 24/10* (2009.01)
*H04W 68/00* (2009.01)
*H04L 29/08* (2006.01)
*H04W 4/029* (2018.01)
*H04W 84/12* (2009.01)
*H04W 88/08* (2009.01)
*H04W 4/33* (2018.01)

(52) U.S. Cl.
CPC ........... *H04W 4/022* (2013.01); *H04W 4/029* (2018.02); *H04W 24/10* (2013.01); *H04W 68/005* (2013.01); *H04W 4/33* (2018.02); *H04W 84/12* (2013.01); *H04W 88/08* (2013.01)

(58) Field of Classification Search
CPC ... H04W 68/005; H04W 88/08; H04W 84/12; H04W 4/022; H04W 4/33; H04L 67/22; H04M 1/72572; G06F 17/3051
See application file for complete search history.

(56) References Cited

U.S. PATENT DOCUMENTS

| | | |
|---|---|---|
| 2008/0225810 A1 | 9/2008 | Buchwald et al. |
| 2012/0309413 A1 | 12/2012 | Grosman et al. |
| 2014/0167961 A1 | 6/2014 | Finlow-bates |
| 2014/0222798 A1 | 8/2014 | Want et al. |
| 2014/0248910 A1 | 9/2014 | Dave et al. |
| 2015/0141037 A1 | 5/2015 | Saha et al. |
| 2015/0148061 A1 | 5/2015 | Koukoumidis et al. |
| 2015/0237470 A1 | 8/2015 | Mayor et al. |
| 2015/0309483 A1 | 10/2015 | Lyman et al. |
| 2016/0025498 A1* | 1/2016 | Le Grand .............. G01C 21/12 701/469 |
| 2016/0057572 A1 | 2/2016 | Bojorquez alfaro et al. |
| 2016/0127483 A1* | 5/2016 | Gao .................. G06F 17/30241 715/738 |
| 2016/0241997 A1* | 8/2016 | Lucas ................... H04W 4/021 |

* cited by examiner

MOBILE COMPUTING DEVICE

DEPARTURE OR ENTRY INTENT-BASED REMINDERS

BACKGROUND

Computing device users are increasingly using small form factor devices, such as mobile phones, tablets, wearable devices, etc., to provide them with reminders based on location or time. For example, a user may set a reminder on a device such that when the user is within proximity to a particular location, the reminder is displayed or announced to the user. As another example, a user may set a reminder on a device such that the reminder is displayed or announced to the user at a particular time.

While such reminders can be useful, there are other times when a user needs to remember to perform a certain task as the user is intending to enter or depart a particular location (e.g., leaving home, arriving at a parent's or friend's home, leaving work). External hardware solutions exist that operate as a beacon unit. However, such systems are expensive, must be installed, and are limited to the location in which the system is installed.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage media for providing a reminder to a user based on the user's intent to depart or enter a location. A transportable, accurate, and efficient intent-based reminder system is provided for establishing a plurality of geofences for plotting a path and subsequently tracking a user's traversal of the path for inferring the user's intent to depart or enter a location. In some examples, the intent-based reminder system piggybacks on actions the computing device is already performing, such as capturing wireless network identifiers and relative signal strengths. Via wireless network-based localization, a position or location of the computing device can be approximated. Localization of a computing device enables the intent-based reminder system to infer a user's intent to depart or enter a location efficiently, for example, with minimal processing, which helps to conserve the battery of the computing device.

Consider as an example that a user is at work and wants to receive a reminder to grab his/her umbrella as he/she is leaving work. The user may not have a particular time that he/she plans to leave. So, a time-based reminder may not be a suitable solution. Further, the user is already at the location where the umbrella is, thus a location-based reminder is not a useful tool. Using aspects of the intent-based reminder system described herein, the user can train the system to recognize a path to the exit and to identify when the user is intending to depart work. To train the system, the user walks towards the exit of his/her workplace with his/her mobile computing device (e.g., phone, tablet, wearable device) to establish a plurality of geofences, thus charting a path to the exit point. In various examples, wireless network identifiers and relative signal strengths are captured and recorded at each of the geofences to generate a fingerprint of the each geofence. The fingerprint of each geofence enables the location-based reminder to identify when the user is traversing the path towards the exit. Upon making a determination that the user is intending to exit his/her workplace, the system alerts the user with a reminder to grab his/her umbrella, thus saving the user from forgetting his/her umbrella and having to return to grab it.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 2A-2I illustrate an example intent-based reminder use case;

DETAILED DESCRIPTION

Figure 1:
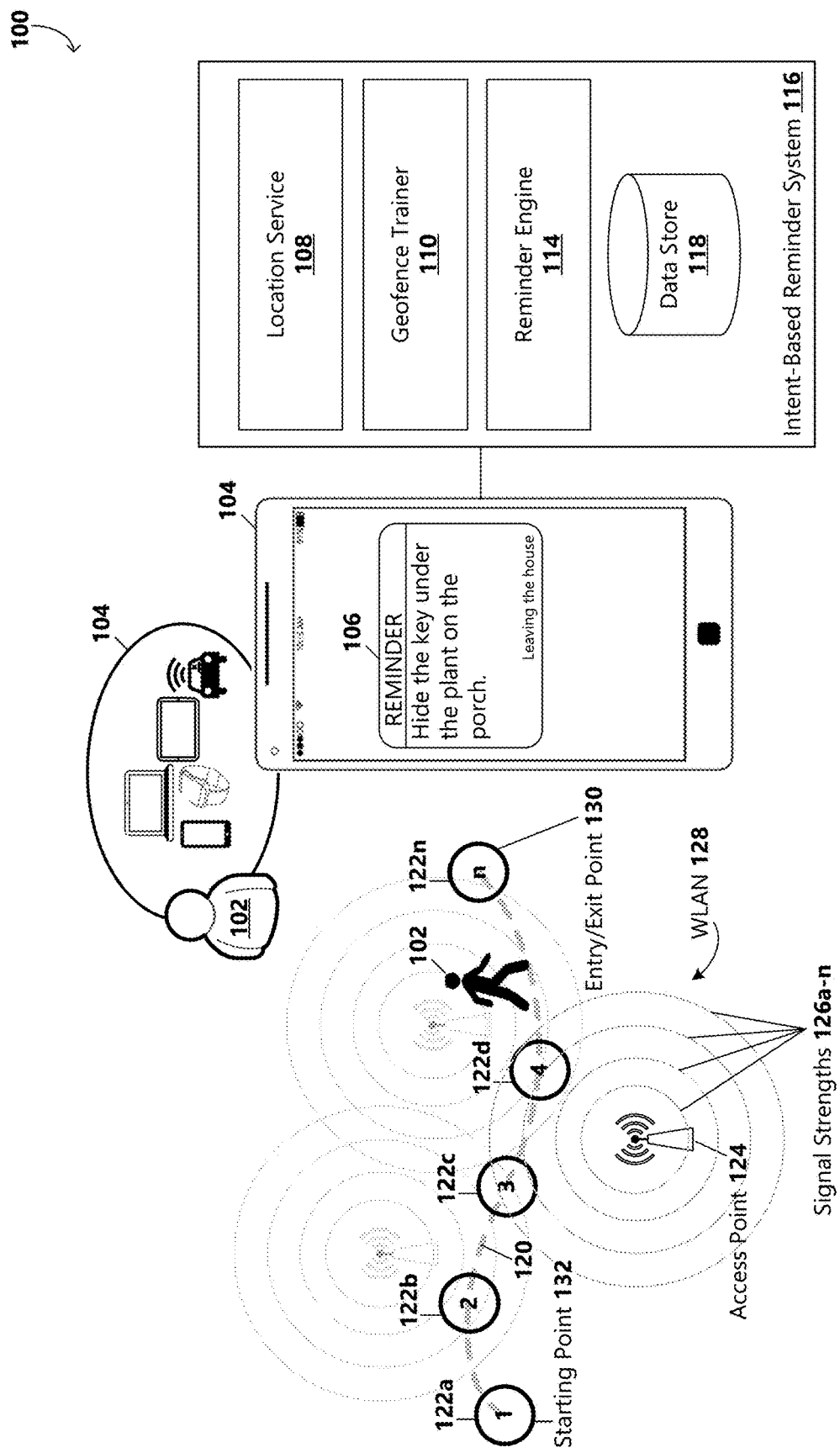
FIG. 1 is a block diagram of an example operating environment including an intent-based reminder system for providing a reminder to a user based on the user's intent to depart or enter a location.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for providing a reminder to a user based on the user's intent to depart or enter a location. With reference now to FIG. 1, an example operating environment 100 including a system for providing intent-based reminders 106 is shown. The example operating environment 100 includes a mobile computing device 104, wherein the mobile computing device 104 may be one of various types of mobile computing devices, such as a mobile phone, a tablet computing device, a wearable device, and the like. In some examples, a plurality of computing devices are used for providing intent-based reminders 106. For example, a mobile computing device 104 may be operatively connected to another computing device, such as a phone, a tablet, a desktop computer, a laptop computer, a laptop/tablet hybrid computing device, a large screen multi-touch display, a gaming device, a smart television, a connected automobile, a smart home device, or other type of computing device. The hardware of these computing devices is discussed in greater detail in regard to FIGS. 4, 5A, 5B, and 6.

According to an aspect, an intent-based reminder system 116 comprises or is in communication with various components including a location service 108, a geofence trainer 110, a reminder engine 114, and a data store 118. In some examples, the location service 108 is illustrative of a software application, system, or device operative to transmit and receive radio frequency communications. For example, the location service 108 includes a wireless networking protocol interface and one or more wireless networking protocol radios, which in some examples, are handled by one or more chips. Each wireless networking protocol radio may have a specific function. For example, one wireless networking protocol radio may be designed to work at a particular frequency to access wireless local area network (WLAN) signals, such as WI-FI signals. In some examples, other wireless radios are included, such as a GPS (Global Positioning System) radio, a BLUETOOTH radio, etc. for transmitting and receiving in particular frequency bands. In some examples, transmissions to and from the one or more wireless networking protocol radios are conducted under control of the mobile computing device's operating system, and are disseminated to one or more components of the intent-based reminder system 116 via the operating system, and vice versa.

According to one aspect, the location service 108 is operative to send probe requests to discover WLANs within the mobile computing device's 104 proximity. For example, a probe request is used to actively seek any, or a particular, access point 124. When seeking a particular access point 124, the location service 108 is operative to send a probe request specifying an SSID (Service Set Identifier) corresponding to the particular access point. When seeking any access point 124, the location service 108 is operative to send a probe request specifying a broadcast SSID. Access points 124 that are within range respond to a probe request with a probe response including its SSID. In some examples, a probe response includes other information, such as supported data rates, encryption types, capabilities of the access point, etc. In some examples, when the mobile computing device 104 connects to a WLAN network, the location service 108 stores the SSID and user-entered password (if required) in a data store, such that the operating system is enabled to discover which known networks are available and can automatically connect to them.

According to an aspect, the location service 108 is further operative to identify and store signal strengths 126a-n (collectively 126) of discovered networks 128. In some examples, a plurality of WLANs 128 and corresponding signal strengths 126 are detected at a given time and a given location. According to one example, a given location is identified via a set of coordinates, which can include a latitude coordinate and a longitude coordinate, and in some examples, an elevation coordinate. According to one aspect, the coordinates of a given location are determined by utilizing a GPS radio to retrieve position data from satellites (e.g., GPS or assisted GPS (AGPS) data). In one example, geospatial coordinates for a location are calculated from a live download of position data from satellites. In another example, geospatial coordinates for a location are estimated based on past downloads of position data from satellites.

According to another aspect, coordinates for a given location are determined via known WLAN 128 and/or cell tower locations. For example, given that cellular carriers have precise GPS measurements of the locations of their cell towers, cell tower positioning can be utilized to determine a position of the mobile computing device 104 by taking measurements of the signal strengths of cell towers within range. In another example, WLAN 128 positioning can be utilized to determine a position of the mobile computing device 104 by taking a snapshot of nearby WLANs to approximate a set of coordinates. In some examples, subsets of data (e.g., SSIDs, locations, signal strengths) about nearby WLANs 128 and cell towers are cached to reduce network activity and increase the speed of localization. For example, signal strengths 126 from a plurality of access points 124 in range are recorded and stored in a data store 118 along with known coordinates of the mobile computing device 104. In some examples, this occurs during an offline phase (e.g., running in the background). In other examples, this occurs during an online phase (e.g., when setting geofences 122 as will be described below). In some examples, the data store 118 is local to the mobile computing device 104. In other examples, the data store 118 is remotely located but accessible to the mobile computing device 104 via a network. Using multilateration techniques, the location service 108 is operative to calculate an estimated mobile computing device position relative to the known cell tower positions or WLAN access points 124. In some examples, a current signal strength measurement at a given location is compared with signal strength measurements of locations stored in the data store 118, and a closest match is determined as an estimated location of the mobile computing device 104.

According to an aspect, the intent-based reminder system 116 comprises a reminder engine 114 illustrative of a software module, system, or device operative to set up the reminder based on a geotagged path 120 or route. In some examples, the reminder engine 114 is a reminder application that executes on the mobile computing device 104. In some examples, the reminder engine 114 provides a user interface for enabling the user 102 to enter or select reminder information, such as text to be displayed, a recording or announcement to be played, a sound to be played, etc. For example, the user 102 may select a certain alert tone and enter text for an intent-based reminder 106, such that when an intent to leave a location (e.g., the user's home) is inferred, the selected alert tone is played and the text is displayed to the user. Various user interface technologies may be utilized for enabling the user 102 to enter or select reminder information. For example, user input may be received via hardware input devices, such as mice, keyboards, remote controls, pen/stylus, and the like. As another example, user input may be received via natural input devices/methods that enable the user 102 to interact with the mobile computing device 104 in a "natural" manner, such as those relying on speech recognition, touch and stylus recognition, gesture recognition both on screen and adjacent to the screen, air gestures, head and eye tracking, voice and speech, vision, touch, hover, gestures, and machine intelligence.

When the user 102 initiates a request for an intent-based reminder 106 for a new location, the reminder engine 114 calls the geofence trainer 110 to geotag a path 120 at the location. According to one example, the location includes an entrance or exit, and the path 120 leads to the entry/exit point 130. According to an aspect, the geofence trainer 110 is illustrative of a software module, system, or device operative to identify a path 120 and add geographical identification metadata or geospatial metadata to a plurality of locations along the path 120. According to examples, the geographical identification metadata or geospatial metadata comprises latitude and longitude coordinates calculated by the location service 108 as described above. In one example, the geofence trainer 110 prompts the user 102 to walk toward the entry/exit point 130 from a starting point 132 with the mobile computing device 104. The geofence trainer 110 tracks the path 120 walked by the user, and creates a plurality of geofences 122*a-n* (collectively 122) sequentially at various positions along the path. For example, the plurality of geofences 122 are set up to ensure a higher level of accuracy of inference of intent to enter or leave a location. According to an aspect, in creating a geofence 122, the geofence trainer 110 records geographical identification metadata (e.g., latitude and longitude coordinates calculated by the location service 108) at a position along the path 120. In some examples, the geofence trainer 110 records a timestamp at each geofence 122 for determining a travel rate estimate between geofences.

Further, the geofence trainer 110 is operative to record a signal strength 126 at each geofence 122. According to example, the signal strengths 126 are captured by the location service 108. In one example, the signal strength 126 is a signal strength measurement of a known WLAN access point 124. For example, if the user 102 is at home, the known WLAN access point 124 is the user's home router, and the signal strength 126 is a measurement of the strength of the user's home WLAN 128 signals. According to an aspect, in some examples, the geofence trainer 110 records signal strengths 126 of nearby WLANs 128 at each geofence 122, generating a fingerprint of the each geofence. For example, the signal strength data of neighboring WLANs 128 helps to filter out false triggers for locations that may have the same signal strength as the geofences 122 or the entry/exit point 130. In some examples, to account for fluctuations in signal strengths 126, each signal strength is recorded as a range (e.g., −65 to −67 dBm). The geofence trainer 110 is further operative to store the geofences 122 for a location (e.g., home, work, friend's home, garage door exit, front door entry) and the corresponding coordinate data, signal strength 126 data, and, in some examples, the timestamp data in the data store 118.

According to an aspect, when an intent-based reminder 106 is set up, the reminder is triggered when a sequence of geofences 122 are triggered. In some examples, the reminder 106 is triggered when a predetermined percentage of the geofences 122 along a path 120 are triggered in an expected order. According to one example, WLAN-based localization methods are used to approximate the position or location of the mobile computing device 104 such that the intent-based reminder system 116 is able to infer the user's intent to depart or enter a location. In some examples, timestamp data is used to calculate a travel rate estimate for determining whether a sequential triggering of geofences 122 is consistent with the travel rate estimate from one geofence to the next for filtering out false triggers.

According to an aspect, the WLAN signal strength 126 of a known WLAN access point 124 at the location is tracked for determining whether the signal strength at each triggered geofence 122 matches the recorded signal strengths. In some example, the WLAN fingerprints comprised of signals strengths 126 of neighboring WLANs 128 are used to filter out false triggers caused by other positions having the same known WLAN access point 124 signal strength. According to an aspect, when the reminder is triggered, the reminder 106 is provided to the user 102 (e.g., an alert is played, text is displayed, an image is displayed, an audible message is played).

Figure 2A:
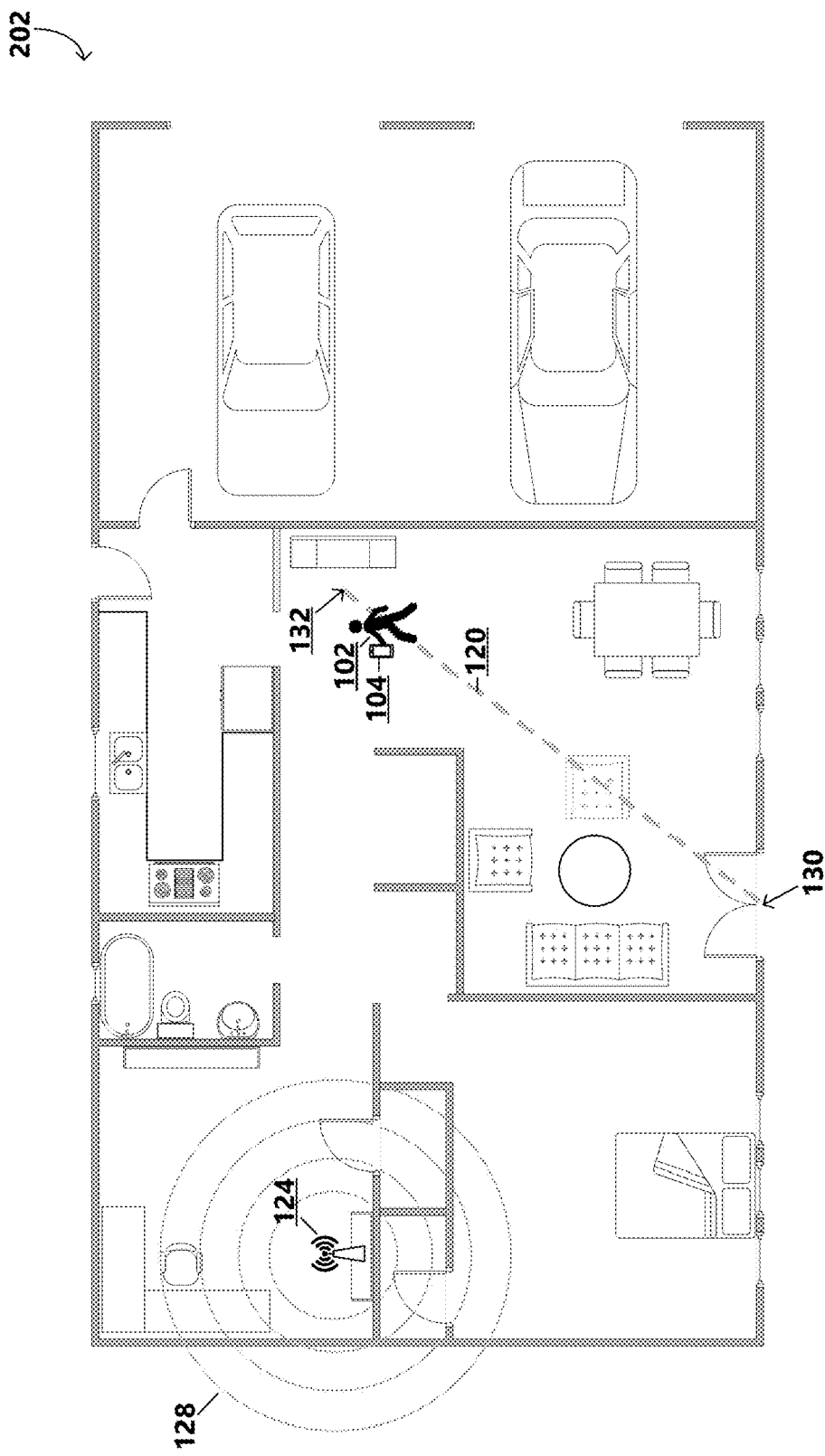

With reference now to FIGS. 2A-2I, an example intent-based reminder use case is illustrated. In FIG. 2A, a location 202 embodied as a user's home is shown. The location 202 includes an access point 124 that projects a WLAN 128*a* signal. According to an example, the user 102 wants to set a reminder 106 to hide the key under the plant on the porch when the user intends to leave home. In some examples, when the user 102 initiates the reminder, the user is presented with preconfigured geotagged locations from which he/she can select. For example and as described above, when a location 202 is geotagged by the geofence trainer 110, geofences 122 for the location (e.g., home, work, friend's home, garage door exit, front door entry) and the corresponding coordinate data, signal strength 126 data, and, in some examples, the timestamp data are stored in the data store 118. Accordingly, when the user 102 wants to set a reminder for a location 202 that has been set up in the intent-based reminder system 116, the user is enabled to simply select the location from a list of preconfigured locations without having to reconfigure geofences 122 for the location. In the example illustrated in FIGS. 2A-2I, the location 202 is not preconfigured, and the user 102 wants to set up a reminder 106 along a path 120 from a starting point 132 where the user typically leaves her purse and keys to an exit point 130 embodied as the front door. As can be appreciated, the user 102 may set up additional reminders along other paths 120 at the location 202, for example, along a path to a garage door, to another exit, or along an entrance path to the house.

Figure 2B:
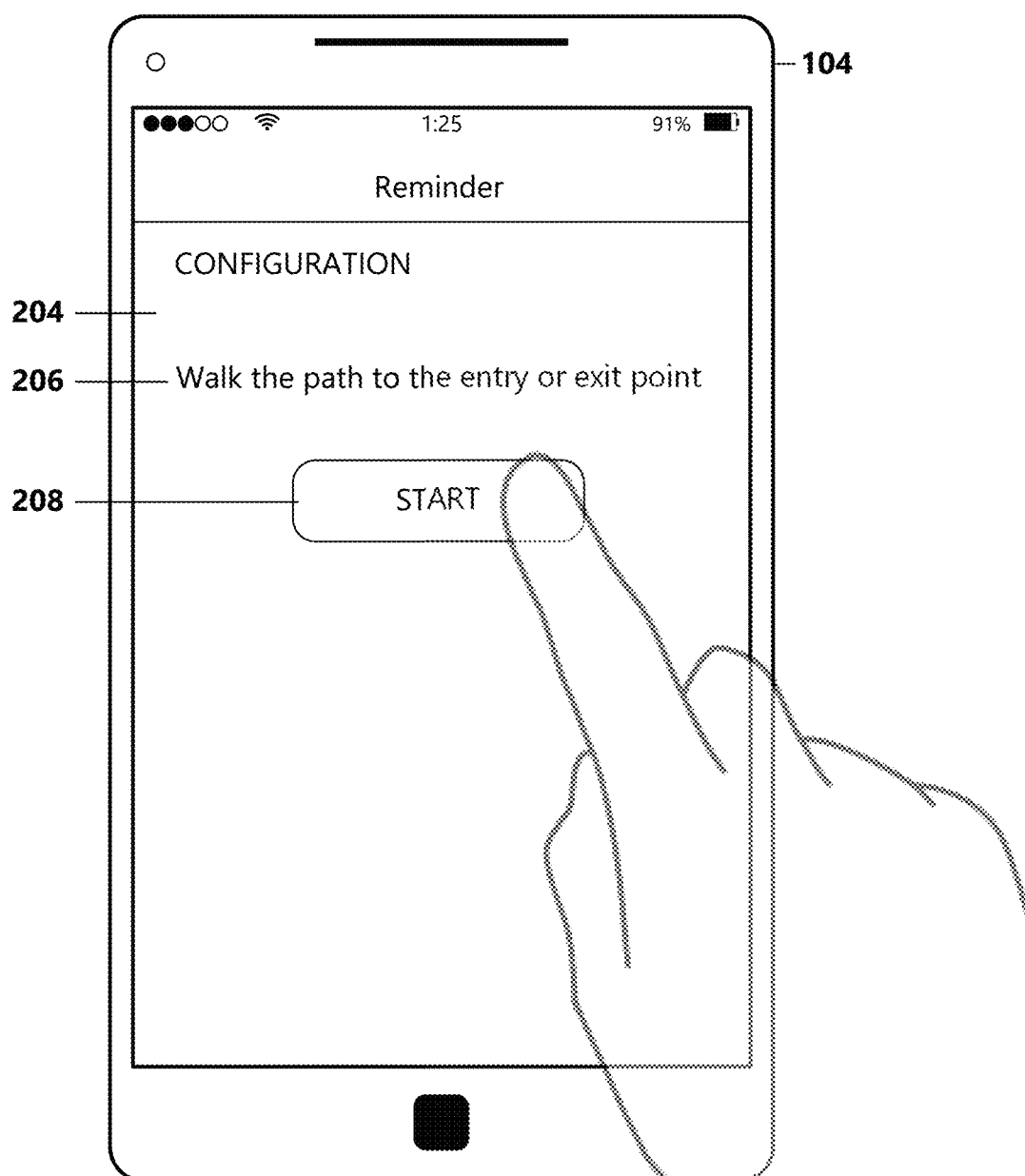

With reference now to FIG. 2B, a UI 204 is generated and displayed to the user 102 that prompts the user to set up the reminder 106. For example, an instruction 206 may be provided that directs the user to go to the starting point 132 to record the path 120. In some examples, a selectable button 208 or control is displayed, which when selected, triggers the geofence trainer 110 to begin tracking the path 120.

Figure 2C:
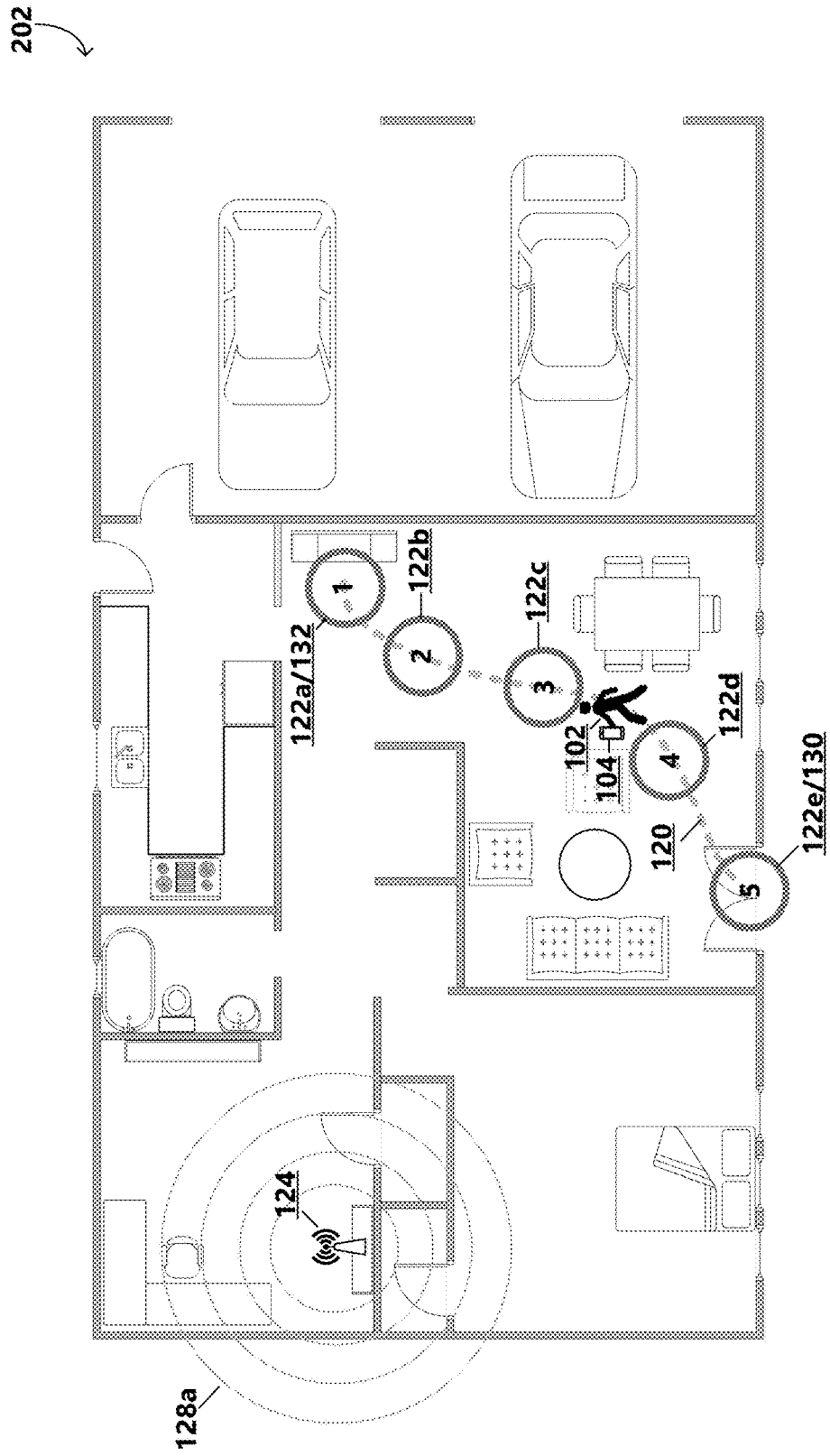
Figure 2D:
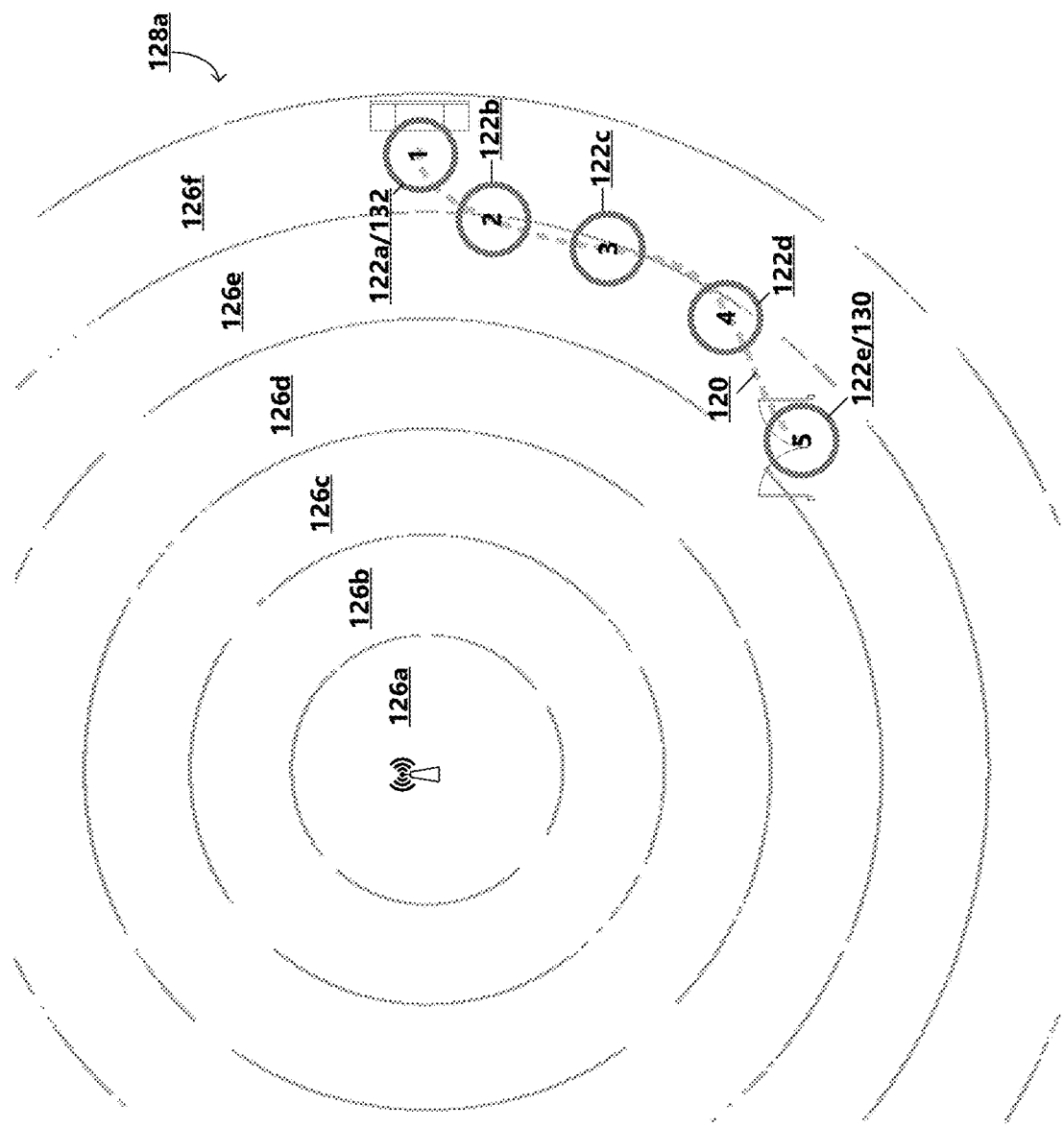

As illustrated in FIG. 2C, a plurality of geofences 122*a-e* are sequentially established as the user 102 walks along the path 120 from the starting point 132 to the exit point 130. According to examples, when establishing the plurality of geofences 122*a-e*, the geofence trainer 110 records the corresponding coordinate data for each geofence. In some examples, the geofence trainer 110 records a timestamp for each geofence 122*a-e*. Further, as illustrated in FIG. 2D, a signal strength measurement 126 of the access point 124 WLAN 128*a* is recorded at each geofence 122*a-e*.

Figure 2E:
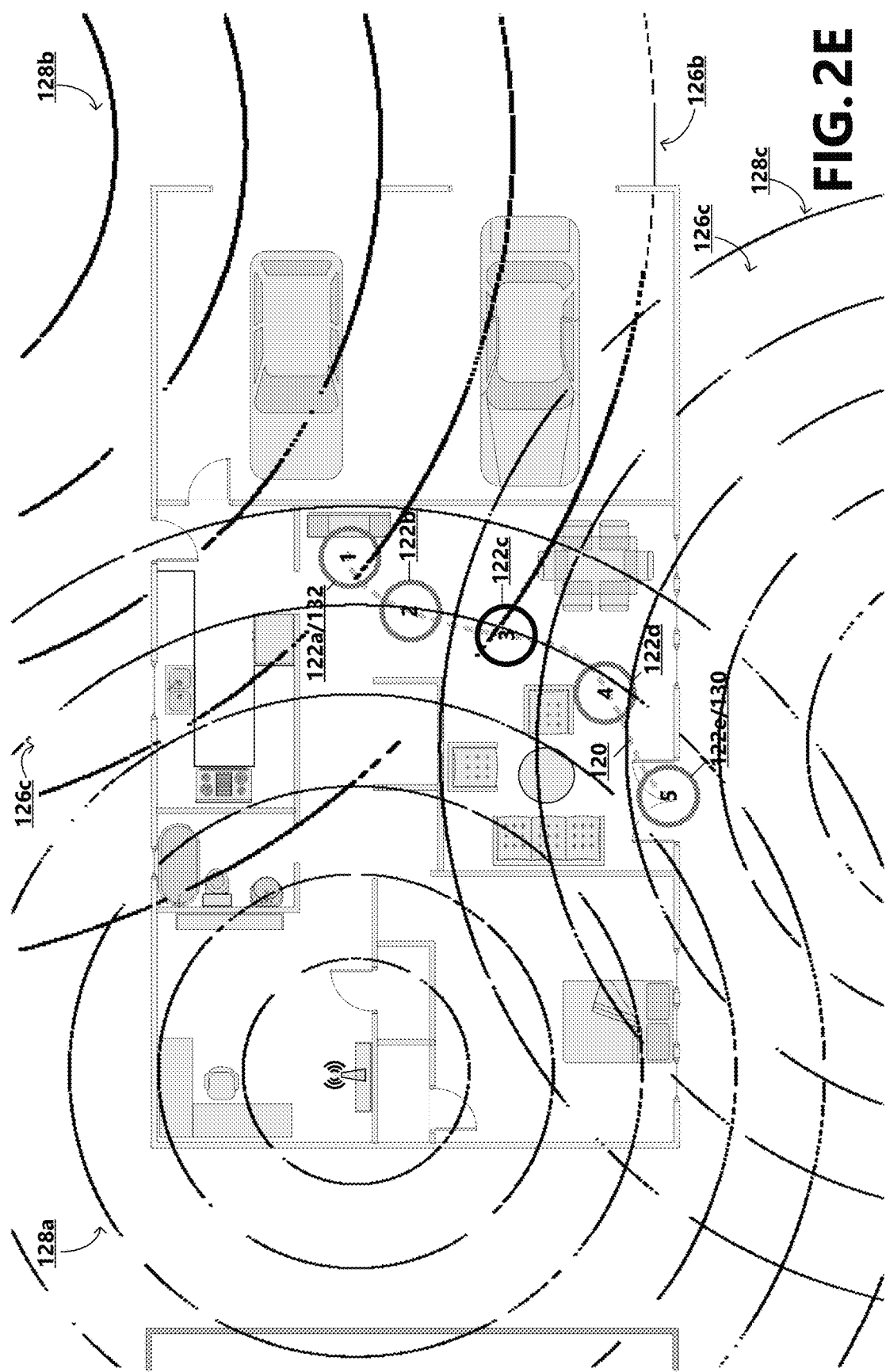

With reference now to FIG. 2E, in some examples, signal strengths 126 of neighboring WLANs 128*b-c* are recorded at each geofence 122*a-e* to establish a WLAN fingerprint for each geofence for improved localization accuracy. For example, geofence 3 122*c* intersects with the user's WLAN 128*a*, neighboring WLAN 128*b*, and neighboring WLAN 128*c*. Accordingly, the signals strengths 126*a,b,c* of the user's WLAN 128*a*, neighboring WLAN 128*b*, and neighboring WLAN 128*c* are retrieved and stored in association with geofence 3 122*c*.

Figure 2F:
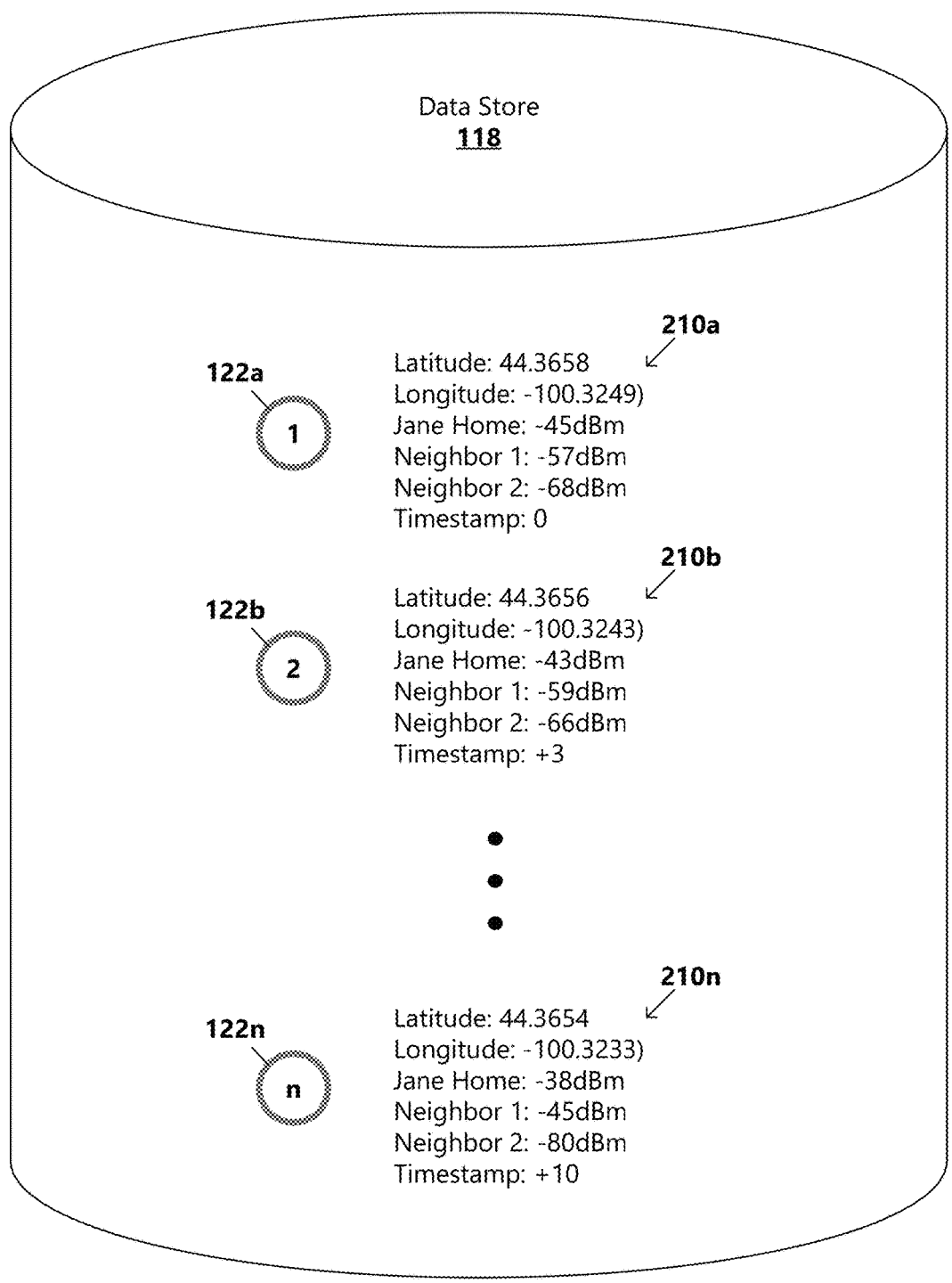

In one example and as illustrated in FIG. 2F, a first geofence 122*a* may have the following fingerprint data 210*a* associated with it as recorded by the geofence trainer 110:

Geofence 1 (122a)
Latitude: 44.3658
Longitude: −100.3249
Jane Home: −45 dBm
Neighbor 1: −57 dBm
Neighbor 2: −68 dBm
Timestamp: 0.

A second geofence 122b may have the following fingerprint data 210b associated with it as recorded by the geofence trainer 110:
Geofence 2 (122b)
Latitude: 44.3656
Longitude: −100.3243
Jane Home: −43 dBm
Neighbor 1: −59 dBm
Neighbor 2: −66 dBm
Timestamp: +3.

An $n^{th}$ geofence 122n may have the following fingerprint data 210n associated with it as recorded by the geofence trainer 110:
Geofence n (122n)
Latitude: 44.3654
Longitude: −100.3233
Jane Home: −38 dBm
Neighbor 1: −45 dBm
Neighbor 2: −80 dBm
Timestamp: +10

For example, the fingerprint data 210 for the geofences 122 includes latitude and longitude coordinates, a signal strength 126 of the user's home WLAN 128a, signal strengths of neighboring WLANs 128b,c, and a timestamp. As should be appreciated, this is a non-limiting example. More or less fingerprint data 210 can be included.

Figure 2G:
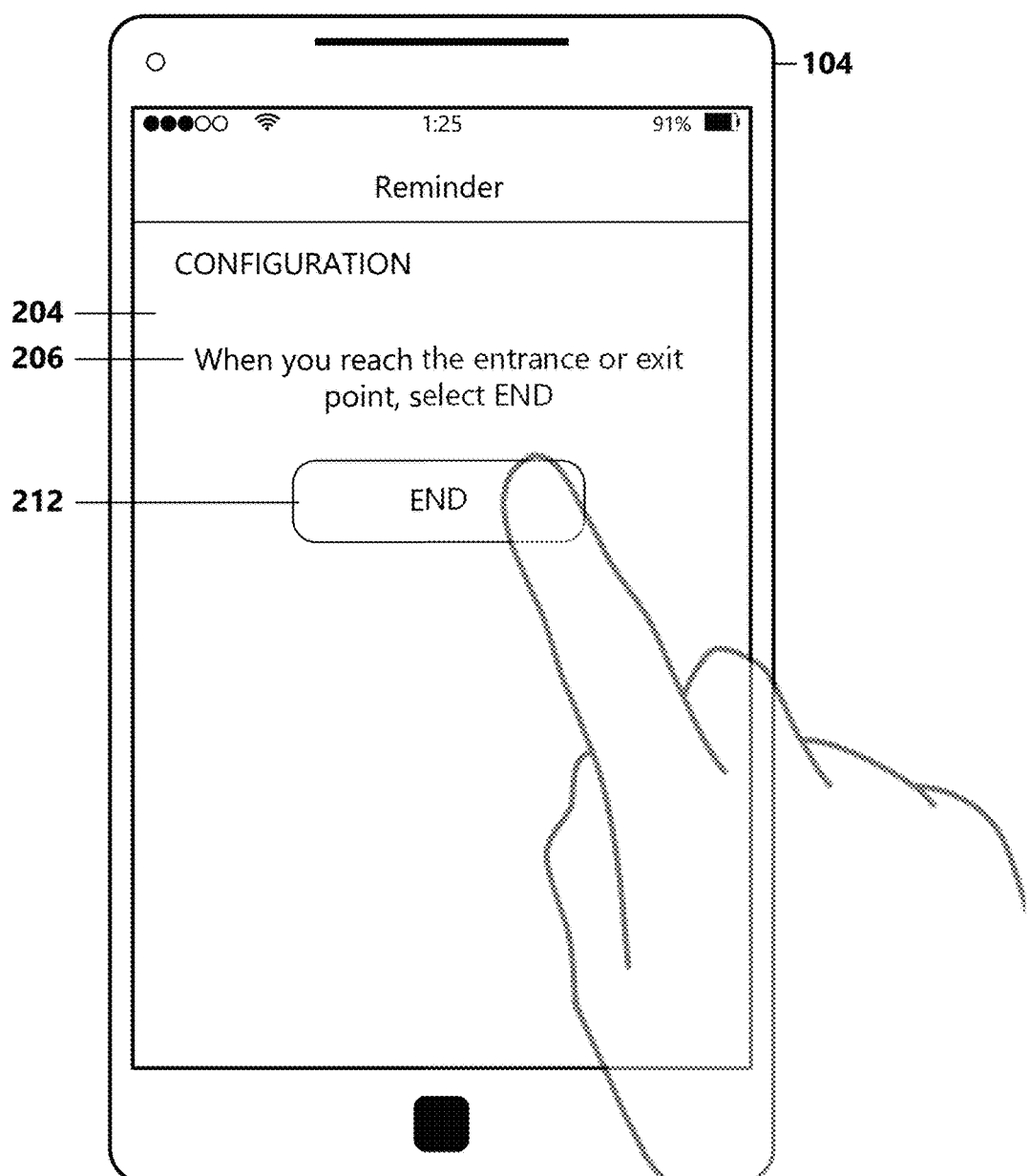

According to an example and with reference now to FIG. 2G, a UI 204 is generated and displayed to the user 102 that prompts the user to selectively end the path geotagging configuration process. For example, an instruction 206 may be provided that directs the user to select an end button 212 or control upon reaching the entry/exit point 132.

Figure 2H:
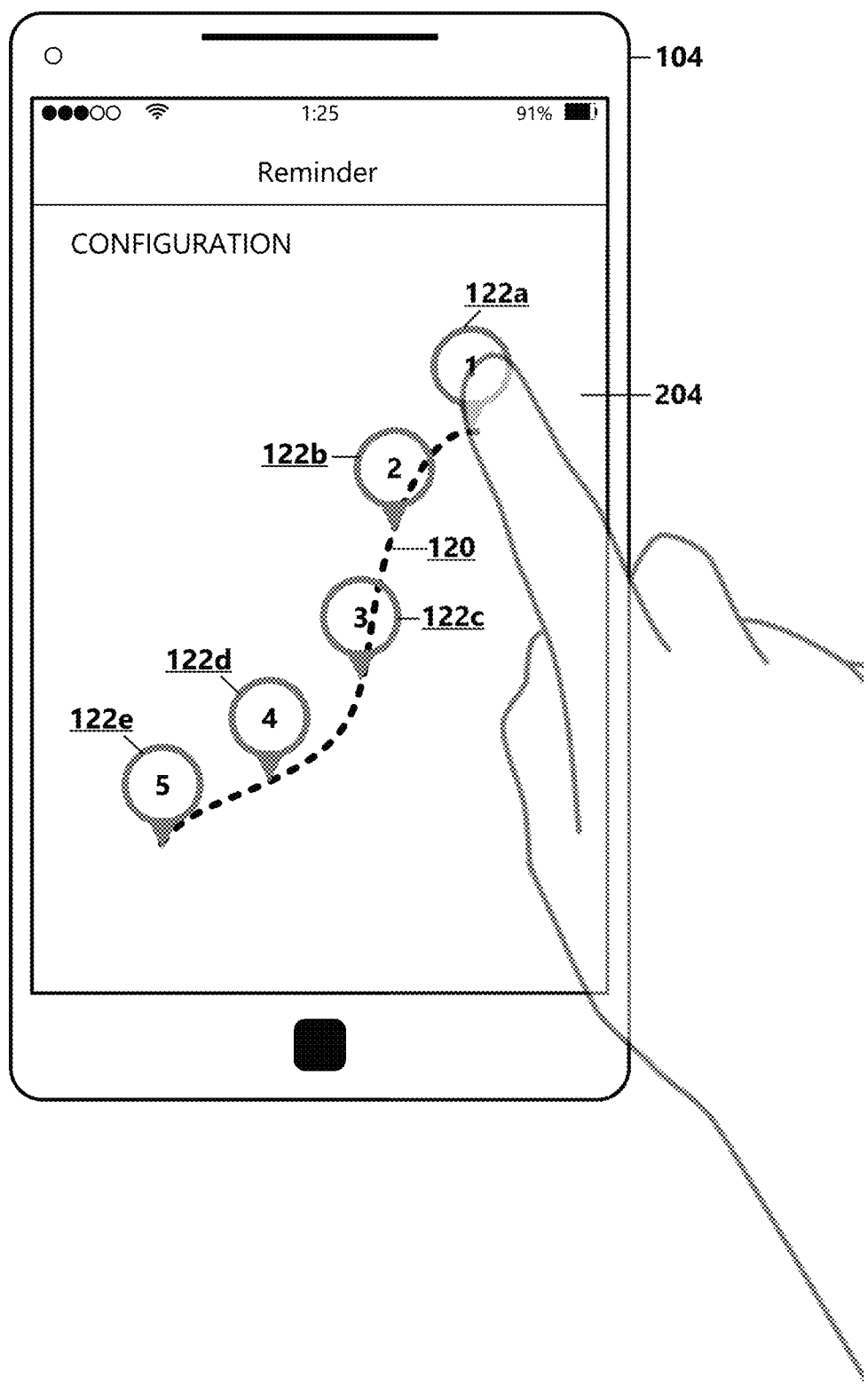
Figure 21:
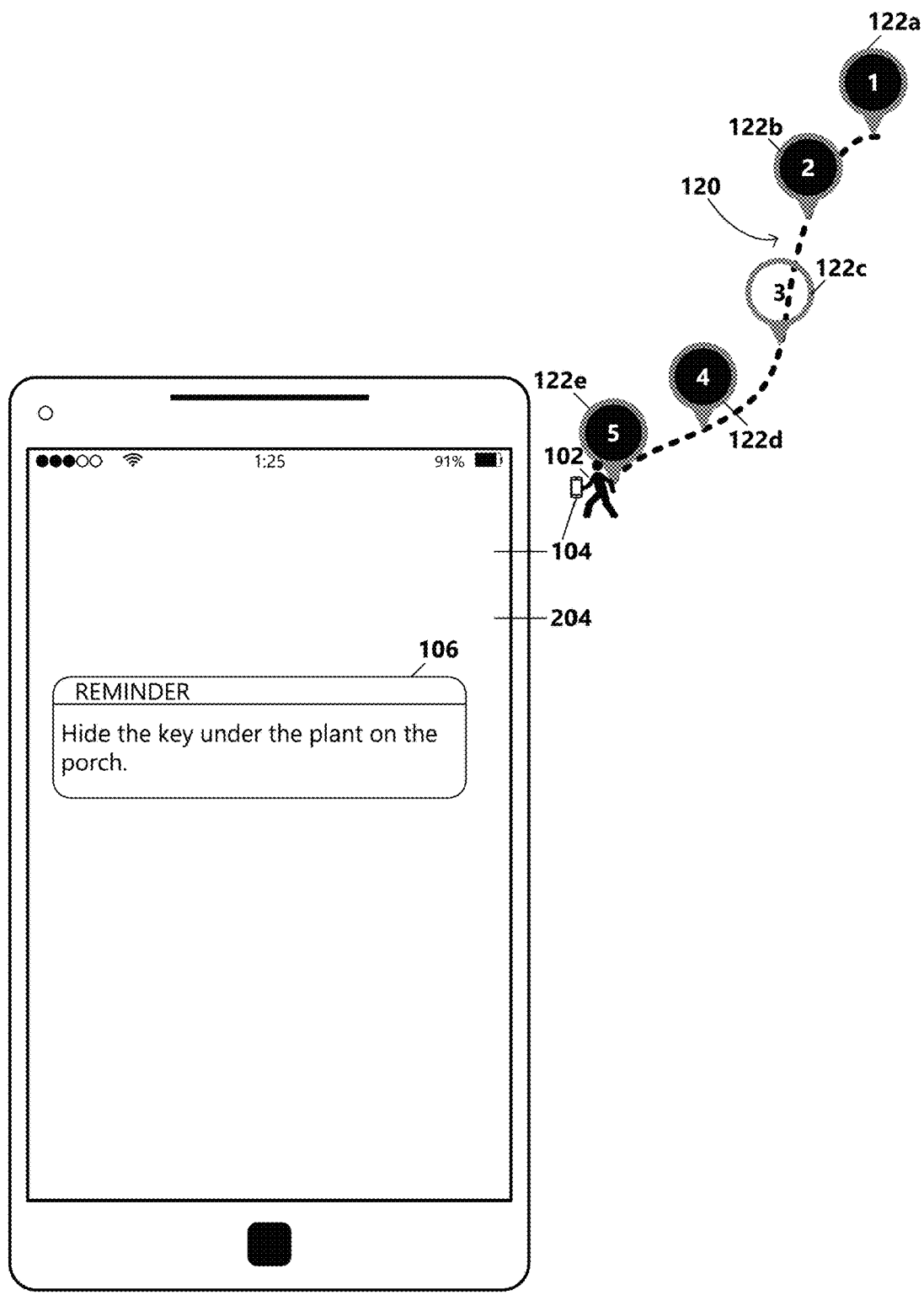

In some examples and as illustrated in FIG. 2H, the intent-based reminder system 116 provides a UI 204 for enabling the user 102 to manage geotagged locations 202. For example, the user 102 may be enabled to move geofences 122, select a desired starting point 132 or entry/exit point 130, and the like. In one example, a map including the location 202 is displayed, and the user 102 is enabled to tag certain entities within the location, such as a kitchen, parking space, etc., and add a geofence 122 at a tagged entity.

With reference now to FIG. 2I, after the reminder 106 is set up and the location 202 is configured and stored, the location of the user's mobile computing device 104 is monitored for determining whether the location of the mobile device sequentially triggers a predetermined percentage of geofences 122 for a particular location 202 associated with a set reminder 106. For example, a percentage of geofences 122 may not be triggered when the user 102 traverses the path 120. In some examples, a geofence 122 may not be triggered if the user 102 does not enter the perimeter of the geofence. In other examples, a geofence 122 may not be triggered if localization is not performed when the mobile computing device 104 is within the geofence. Other geofence mis-trigger scenarios are possible and are within the scope of the present disclosure.

According to an example, location of the mobile computing device 104 is determined by GPS-based location, WLAN-based location, cell tower-based location, or a combination of localization methods. Further, in some examples, the recorded signal strengths 126 of neighboring WLANs 128b,c and/or timestamp data are used to filter out false triggers. When a determination is made that a reminder is triggered, the intent-based reminder system 116 generates a reminder 106, and provides the reminder to the user 102. In one example and as illustrated in FIG. 2I, the reminder 106 includes text displayed in the UI 204. Other types of reminders 106 (e.g., audible, visible, tactile) are possible and are within the scope of the present disclosure.

Figure 3:
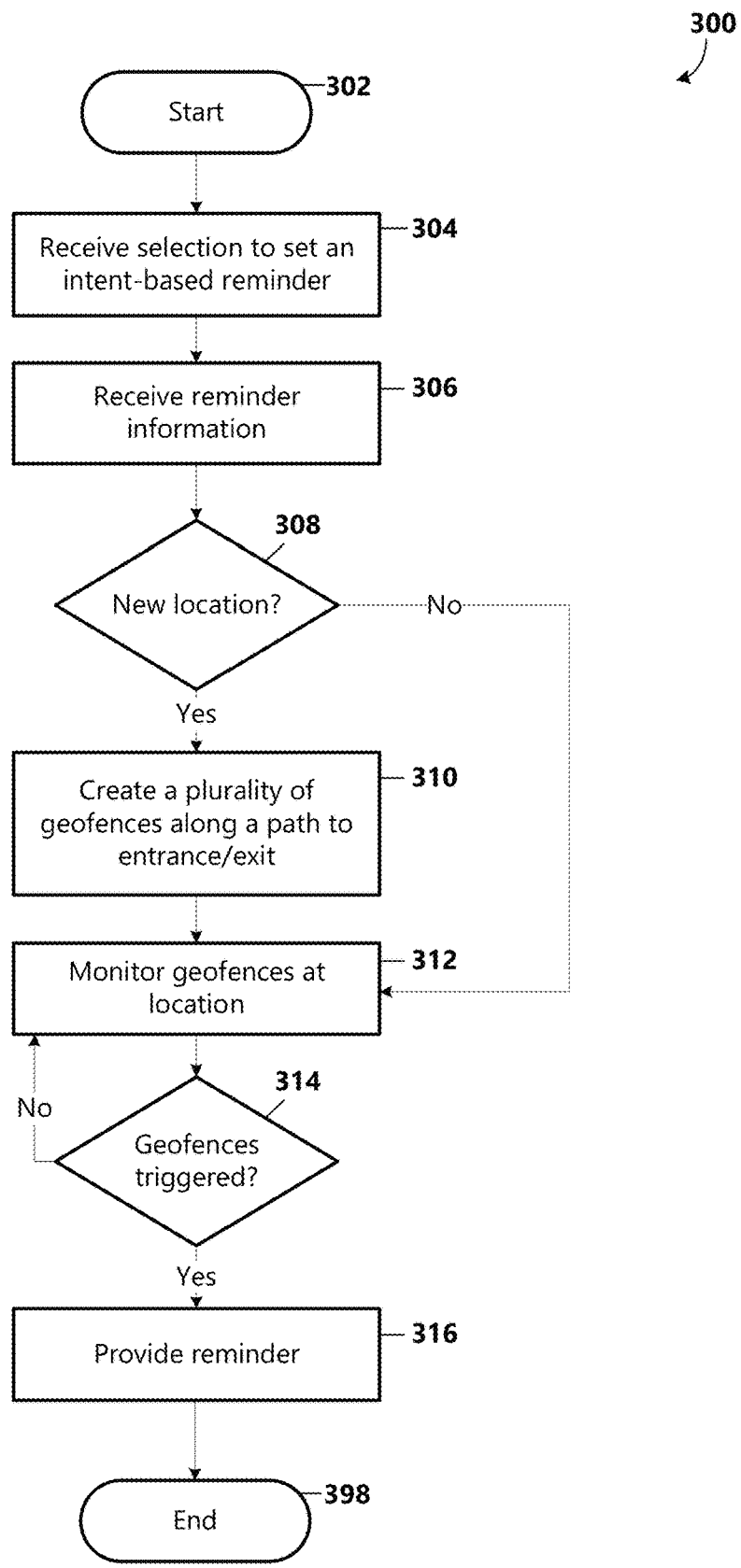
FIG. 3 is a flow chart showing general stages involved in an example method for providing a reminder to a user based on the user's intent to depart or enter a location.

FIG. 3 is a flow chart showing general stages involved in an example method 300 for providing a reminder 106 to a user based on the user's intent to depart or enter a location 202. The method 300 starts at OPERATION 302, and proceeds to OPERATION 304, where an indication of a selection to set an intent-based reminder 106 is received. In some examples, the user 102 utilizes a reminder application (i.e., reminder engine 114) to set the intent-based reminder 106. For example, the user 102 may speak or select a command to set the intent-based reminder 106.

The method 300 proceeds to OPERATION 306, where reminder information is received. In some examples, the reminder information includes information that the user 102 wants to be reminded of when an intent to leave or enter a location 202 is determined. For example, the reminder 106 may be a reminder to grab an item before leaving a location 202, to perform a tasking upon arriving or leaving a location, etc. In some examples, a reminder 106 can be shared with other users. For example, consider that the user 102 is a parent of a newborn baby. When putting the baby down for a nap, the user 102 is enabled to set an intent-based reminder 106 to remind another user (e.g., the other parent, other child, an expected visitor) to not ring the doorbell or to be quiet when an intent to enter the house (e.g., location 202) is determined. For example, the reminder information can be entered and the geofences 122 can be created on the user's mobile device 104 and then be shared with one or more other users. The reminder information and geofences 122 can then be stored in a data store 118 on the one or more other users' devices 104 or in a remote data store that is communicatively accessible by the one or more other users' devices.

Continuing with the example method 300, a determination is made as to whether the location 202 associated with the reminder 106 is a preconfigured location (e.g., a location that has been previously set up for intent-based reminders) or is a new location at DECISION OPERATION 308. When a determination is made that the location 202 is a new location, the method 300 continues to OPERATION 310, where the geofence trainer 110 creates a plurality of geofences 122 along a path 120 to the entry/exit point 130. In examples, the user 102 is prompted to walk the path 120 from a starting point 132 to the entry/exit point 130, and the plurality of geofences 122 are created and stored with coordinate data and recorded signal strength data 126. In one example, the recorded signal strength data 126 includes the signal strength 126 of an access point 124 associated with the location 202. In another example, the recorded signal strength data 126 includes the signal strengths 126 of neighboring WLANs 128. In another example, the geofence data (fingerprint data 210) includes a timestamp of when the mobile computing device 104 was located at the geofence position when creating the geofence 122. In another example, a geofence 122 is created via selecting a position on a map displayed on the mobile computing device 104.

In some aspects, the user 102 selects to associate more than one path 120 with a reminder 106. For example, the user 102 may want to receive a reminder to put a pet in its crate when an intent to leave a friend's house (location 202) is determined. The friend's house may have multiple exits that the user 102 may use to leave. Accordingly, the user 102 may selectively associate a plurality of paths 120 with the reminder 106. In other aspects, the user 102 is enabled to set a plurality of reminders 106 at a given time, wherein each reminder may be associated with a same or various paths 120.

The method 300 proceeds to OPERATION 312 from OPERATION 310 or when a determination is made that the location 202 is a preconfigured location (e.g., the user 102 selects the preconfigured location from a list) at DECISION OPERATION 308. At OPERATION 312, the plurality of geofences 122 associated with the reminder 106 are monitored, for example, for determining whether the user's mobile computing device 104 triggers a predetermined percentage of the geofences 122 associated with the reminder 106 at DECISION OPERATION 314. When a determination is made that the user's mobile computing device 104 has not triggered a predetermined percentage of the geofences 122 associated with the reminder 106, the method 300 returns to OPERATION 312, where the plurality of geofences continue to be monitored.

When a determination is made that the user's mobile computing device 104 has triggered a predetermined percentage of the geofences 122 associated with the reminder 106, the method 300 proceeds to OPERATION 316, where the reminder 106 is provided to the user 102. For example, the reminder 106 includes reminder information received at OPERATION 306 (e.g., information that the user 102 wants to be reminded of when an intent to leave or enter a location 202 is determined). The reminder 106 may be displayed, a sound may be played, the reminder may be read, tactile feedback may be provided, etc. The method 300 ends at OPERATION 398.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
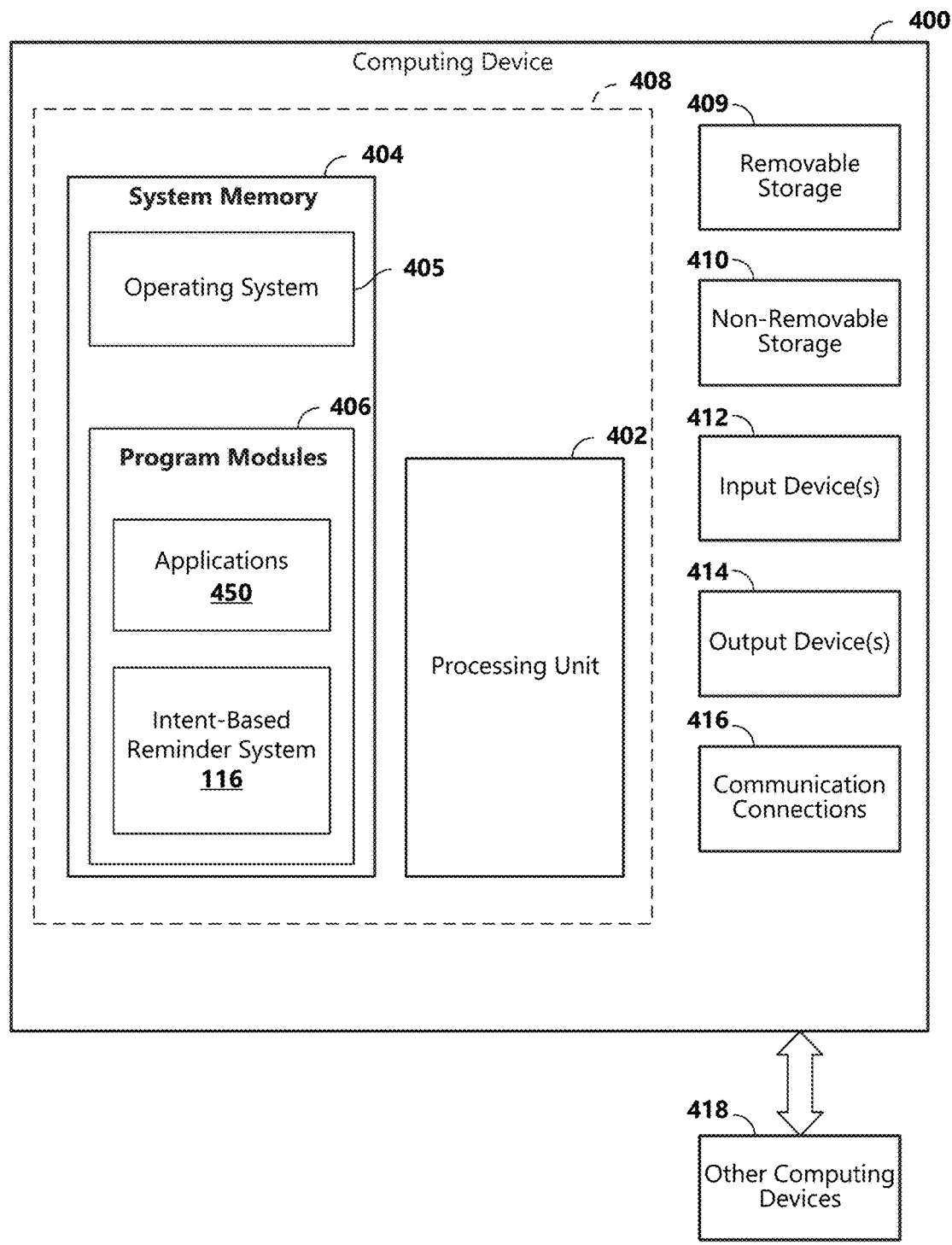
FIG. 4 is a block diagram illustrating example physical components of a computing device.
Figure 5A:
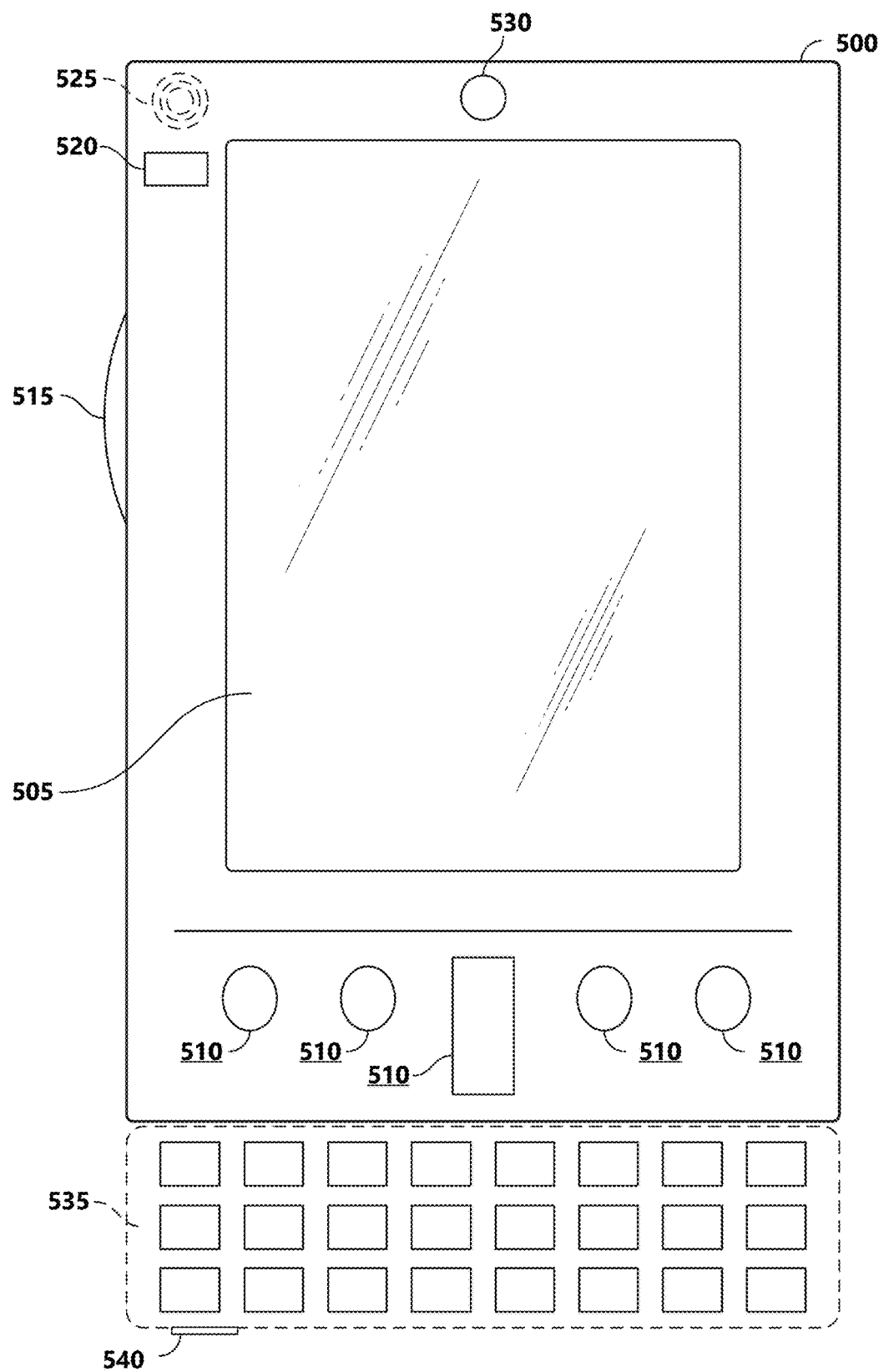
FIGS. 5A and 5B are simplified block diagrams of a mobile computing device.
Figure 5B:
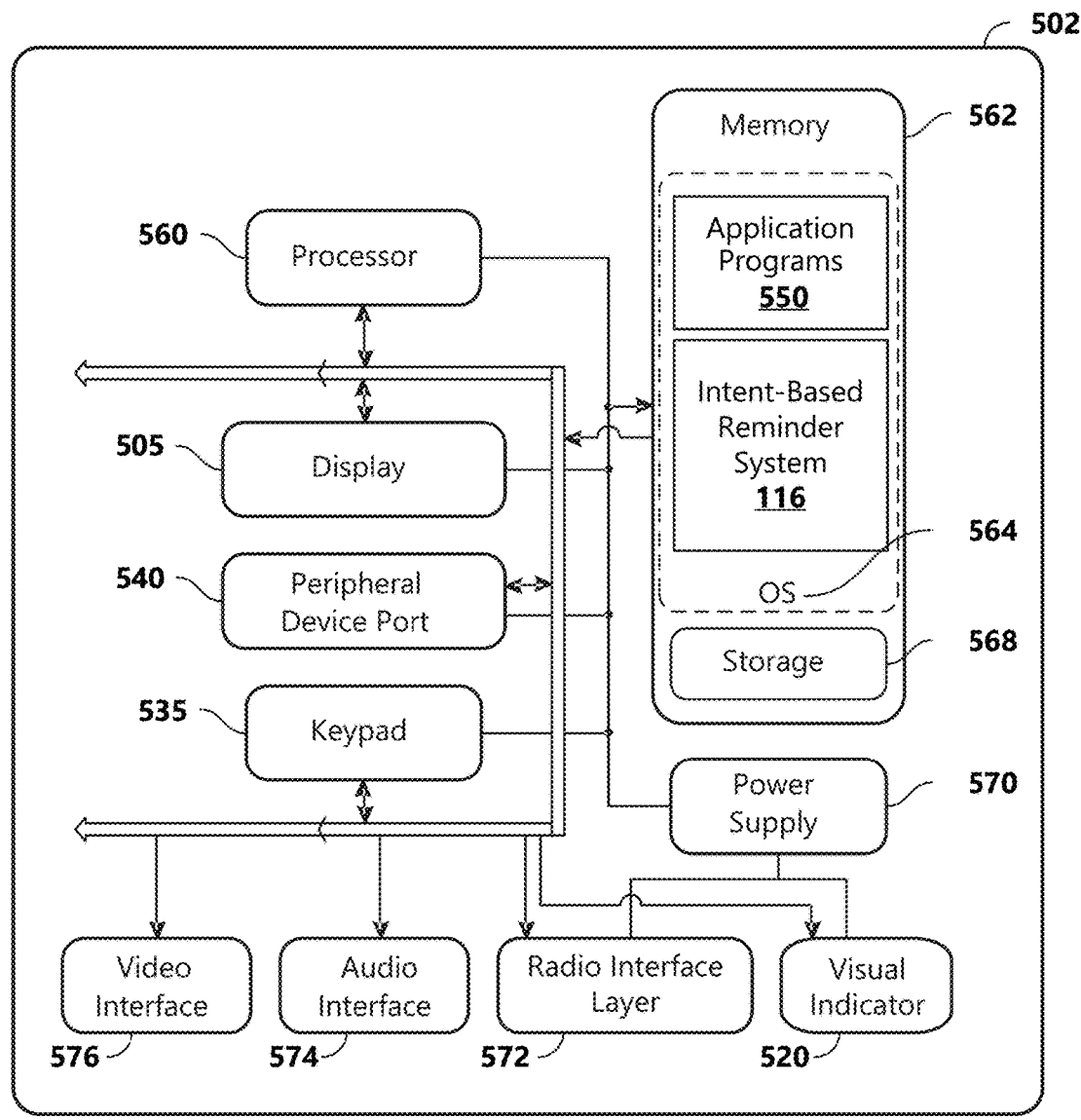
Figure 6:
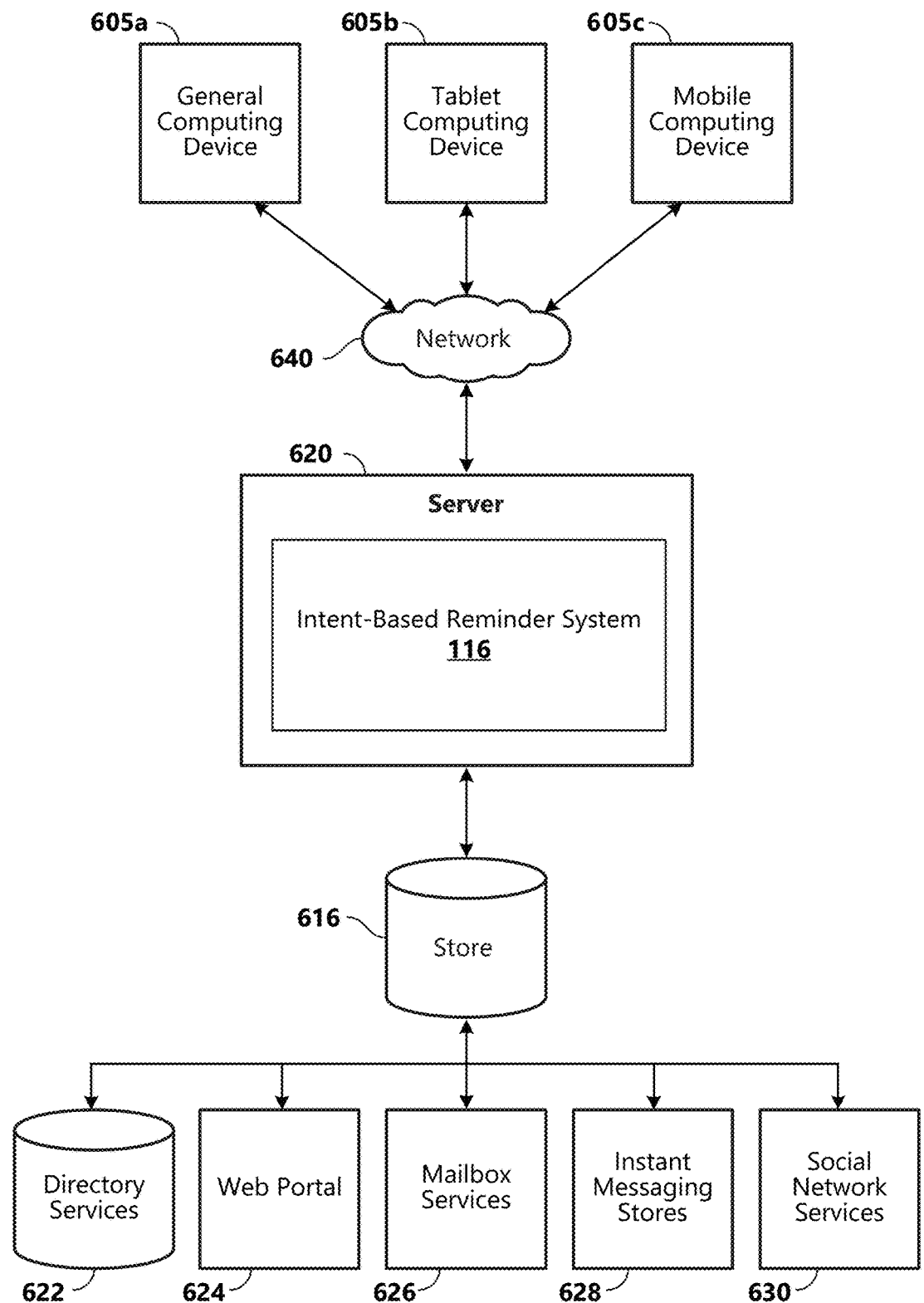
FIG. 6 is a simplified block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the intent-based reminder system 116. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., intent-based reminder system 116) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the intent-based reminder system 116 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries.

According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

FIG. 6 illustrates one example of the architecture of a system for providing intent-based reminders 106 as described above. Content developed, interacted with, or edited in association with the intent-based reminder system 116 is enabled to be stored in different communication channels or other storage types. For example, various documents may be stored using a directory service 622, a web portal 624, a mailbox service 626, an instant messaging store 628, or a social networking site 630. The intent-based reminder system 116 is operative to use any of these types of systems or the like for providing intent-based reminders 106, as described herein. According to an aspect, a server 620 provides the intent-based reminder system 116 to clients 605a,b,c. As one example, the server 620 is a web server providing the intent-based reminder system 116 over the web. The server 620 provides the intent-based reminder system 116 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing an intent-based reminder to a user, comprising:
   receiving an indication of a selection to set an intent-based reminder on a mobile computing device of the user;
   receiving reminder information including information to provide a reminder on the mobile computing device when an intent to leave or enter a location is determined; and
   in response to determining that the location is a new location:
      creating a plurality of geofences along a path to an entry or exit point;
      recording data associated with each geofence;
      monitoring the plurality of geofences to determine whether the mobile computing device has triggered a predetermined percentage of the plurality of geofences; and
      responsive to determining that the mobile computing device has triggered at least the predetermined percentage of the plurality of geofences:
         determining an intent of the user to enter or exit the location; and
         providing the intent-based reminder to the user.

2. The computer-implemented method of claim 1, wherein prior to creating the plurality of geofences, prompting the user to travel along the path to the entry or exit point from a starting point with the mobile computing device.

3. The computer-implemented method of claim 2, wherein recording data associated with each geofence comprises recording geospatial coordinates of the mobile computing device at a position along the path.

4. The computer-implemented method of claim 3, wherein recording geospatial coordinates of the mobile computing device at a position along the path comprises determining geospatial coordinates based on at least one of:
   GPS-based data;
   WLAN-based localization data; and
   cellular tower localization data.

5. The computer-implemented method of claim 1, wherein recording data associated with each geofence comprises recording a signal strength measurement of a WLAN access point associated with the location.

6. The computer-implemented method of claim 1, wherein recording data associated with each geofence comprises recording a signal strength measurement of at least one neighboring WLAN access point.

7. The computer-implemented method of claim 1, wherein recording data associated with each geofence comprises recording a timestamp as the user to travels along the path to a position of the geofence.

8. The computer-implemented method of claim 1, wherein creating the plurality of geofences along the path to the entry or exit point comprises:
   displaying a map including the location; and
   responsive to receiving a selection of a position on the map, creating a geofence at the position.

9. A computer-implemented method for providing an intent-based reminder to a user, comprising:
   receiving reminder information to provide an intent-based reminder on a mobile computing device of the user, the reminder information comprising coordinates of a plurality of geofences, wherein a first geofence is a starting point and a last geofence is an entry or exit point of a location;
   monitoring the plurality of geofences for determining whether the mobile computing device has triggered a predetermined percentage of the plurality of geofences; and
   responsive to determining that the mobile computing device has triggered at least the predetermined percentage of the plurality of geofences:
      determining an intent of the user to enter or exit the location; and
      providing the intent-based reminder to the user.

10. The computer-implemented method of claim 9, wherein monitoring the plurality of geofences for determining whether the predetermined percentage of the plurality of geofences has been triggered comprises determining whether coordinates of the mobile computing device pass within at least the predetermined percentage of the plurality of geofences in a sequential order.

11. The computer-implemented method of claim 10, wherein receiving reminder information associated with the intent-based reminder comprises receiving a signal strength measurement of a WLAN access point associated with the location at each geofence.

12. The computer-implemented method of claim 11, wherein monitoring the plurality of geofences for determining whether the predetermined percentage of the plurality of geofences has been triggered further comprises, for each geofence, determining whether a signal strength measurement taken by the mobile computing device matches the signal strength measurement of the WLAN access point associated with the location of the geofence.

13. The computer-implemented method of claim 12, wherein receiving reminder information associated with the intent-based reminder comprises receiving a signal strength measurement of at least one neighboring WLAN access point at each geofence.

14. The computer-implemented method of claim 13, wherein monitoring the plurality of geofences for determining whether the predetermined percentage of the plurality of geofences has been triggered further comprises, for each geofence, determining whether a signal strength measurement taken by the mobile computing device matches the signal strength measurement of the at least one neighboring WLAN access point associated with the location of the geofence.

15. A mobile computing device for providing an intent-based reminder to a user, the mobile computing device comprising:
   at least one processing device; and
   at least one computer readable data storage device storing instructions that, when executed by the at least one processing device are operative to:
      receive an indication of a selection to set an intent-based reminder;
      receive reminder information including information that the user wants to be reminded of when an intent to leave or enter a location is determined;
      in response to determining that the location is a new location:
         create a plurality of geofences along a path to an entry or exit point; and
         record data associated with each geofence, the data comprising coordinates of the plurality of geofences, wherein a first geofence is a starting point and a last geofence is the entry or exit point of the location;
      monitor the plurality of geofences for determining whether a predetermined percentage of the plurality of geofences has been triggered; and
      responsive to determining that at least the predetermined percentage of the plurality of geofences has been triggered:
         determine an intent of the user to enter or exit the location; and
         provide the intent-based reminder to the user.

16. The mobile computing device of claim 15, wherein in recording data associated with each geofence, the mobile computing device is operative to record geospatial coordinates of the mobile computing device at a position along the path, wherein the geospatial coordinates are based on at least one of:
   GPS-based data;
   WLAN-based localization data; and
   cellular tower localization data.

17. The mobile computing device of claim 15, wherein in recording data associated with each geofence, the mobile computing device is operative to record a signal strength measurement of at least one of:
   a WLAN access point associated with the location; and
   at least one neighboring WLAN access point.

18. The mobile computing device of claim 15, wherein in monitoring the plurality of geofences for determining whether the predetermined percentage of the plurality of geofences has been triggered, the mobile computing device is operative to determine whether coordinates of the mobile computing device pass within at least the predetermined percentage of the plurality of geofences in a sequential order.

19. The mobile computing device of claim 15, wherein in monitoring the plurality of geofences, the mobile computing device is operative to, for each geofence, perform at least one of:
   determine whether a signal strength measurement taken by the mobile computing device matches a signal strength measurement of a WLAN access point associated with the location of the geofence; and
   determine whether a signal strength measurement taken by the mobile computing device matches a signal strength measurement of at least one neighboring WLAN access point associated with the location of the geofence.

20. The mobile computing device of claim 15, wherein in creating the plurality of geofences along the path to the entry or exit point, the mobile computing device is further operative to:
   display a map including the location; and
   responsive to receiving a selection of a position on the map, create a geofence at the position.

\* \* \* \* \*